(12) United States Patent  
Shiraishi

(10) Patent No.: US 6,864,947 B2  
(45) Date of Patent: Mar. 8, 2005

(54) METHOD OF FABRICATING LIQUID CRYSTAL DISPLAY SUBSTRATE AND THE SAME

(75) Inventor: Hideaki Shiraishi, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 341 days.

(21) Appl. No.: 09/774,921

(22) Filed: Jan. 31, 2001

(65) Prior Publication Data

US 2001/0012089 A1 Aug. 9, 2001

(30) Foreign Application Priority Data

Feb. 1, 2000 (JP) ........................................ 2000-024468

(51) Int. Cl.[7] .......................... G02F 1/1333; G02F 1/13  
(52) U.S. Cl. ...................................... 349/158; 349/187  
(58) Field of Search ............................... 349/153, 158, 349/187, 190, 155; 219/121.72, 121.69

(56) References Cited

U.S. PATENT DOCUMENTS

| | | | |
|---|---|---|---|
| 4,275,494 A | 6/1981 | Kohyama | 29/592.1 |
| 5,851,411 A | 12/1998 | An et al. | 216/23 |
| 6,010,384 A | * 1/2000 | Nishino et al. | 445/24 |
| 6,239,855 B1 | * 5/2001 | Nakahara et al. | 349/153 |

FOREIGN PATENT DOCUMENTS

| | | |
|---|---|---|
| JP | 53-41945 | 9/1951 |
| JP | 54-143248 | 11/1979 |
| JP | 59-182421 | 10/1984 |
| JP | 03-258476 | 11/1991 |
| JP | 05-188387 | 7/1993 |
| JP | 6-3638 | 1/1994 |
| JP | 52-080855 | 7/1997 |
| JP | 9 311323 | * 12/1997 |
| JP | 11-014953 | 1/1999 |
| JP | 11-44878 | 2/1999 |
| JP | 11-160667 | 6/1999 |
| JP | 2000-231087 | 8/2000 |

OTHER PUBLICATIONS

Patent Abstract of Japan No. 55126212, dated Sep. 29, 1980.

* cited by examiner

*Primary Examiner*—Dung T. Nguyen  
(74) *Attorney, Agent, or Firm*—Scully, Scott, Murphy & Presser

(57) ABSTRACT

To provide a method of fabricating a liquid crystal display substrate and a liquid crystal display substrate, in which the extra length portion of a substrate is made as small as possible as well as the precision of cutting of the adhered substrate is enhanced, and pollution of facilities of the following processes due to the occurrence of particles, cullet and the like can be prevented, and which can be cut without being influenced by the seal layer, at least one or more scribe cracks are formed on respective faces of two sheets of the substrates opposed to each other via the seal layer enclosing the liquid crystal layer, and the adhered substrates are cut after said two sheets of the substrates are adhered via said seal layer.

4 Claims, 11 Drawing Sheets

INWARD ← → OUTWARD

INWARD ← → OUTWARD

METHOD OF FABRICATING LIQUID CRYSTAL DISPLAY SUBSTRATE AND THE SAME

BACKGROUND OF THE INVENTION

1. Field of the Invention

The present invention relates to a method of fabricating a liquid crystal display substrate for use in a liquid crystal display device and a liquid crystal display substrate which is made by this method of fabrication.

2. Description of the Related Art

Conventionally, a liquid crystal display substrate, which is a display member of a liquid crystal display device, is constituted by superimposing two sheets of transparent glass substrates each other, which are different in size, via a seal agent.

FIG. 1A is a perspective view showing a constitution of a conventional liquid crystal display substrate, and FIG. 1B is a sectional view taken on the line Z–Z' of FIG. 1A. As shown in FIGS. 1A and 1B, a conventional liquid crystal display substrate 1 is constituted by superimposing a first substrate 11 and a second substrate 12 disposed as opposed to this first substrate 11 and having a CF (color filter: not shown) via a seal layer 2 and a liquid crystal layer 20. The seal layer 2 is sandwiched between the first substrate 11 and the second substrate 12. Moreover, when superimposing the second substrate 12 over the first substrate 11, in an area where the first substrate 11 is projecting (hereinafter, referred to as extra length portion 3), a terminal portion 31 having a drive circuit (not shown) consisted of a thin film transistor and the like is formed. The seal layer 2 is formed along a circumferential portion of a face on which the first substrate 11 and the second substrate 12 oppose to each other, within a space formed by the seal layer 2, the first substrate 11 and the second substrate 12 (hereinafter, referred to as liquid crystal enclosing portion), a liquid crystal agent is enclosed, and a liquid crystal layer 20 is formed. The liquid crystal layer 20 and the seal layer 2 can be seen through the second substrate 12 in FIG. 1A. In addition, as shown in FIG. 1B, in a conventional liquid crystal display substrate 1, a terminal face 2a of the seal layer 2 forms a concave portion relative to a terminal face 11a of the first substrate 11 and a terminal face 12a of the second substrate 12.

Next, a conventional method of fabricating the liquid crystal display substrate 1 will be described below. FIG. 2A to FIG. 2F are perspective views showing a procedure of a method of fabricating the conventional liquid crystal display substrate 1. As shown in FIG. 2A, first, a seal agent is applied using a dispenser 14 and the like on an adhesive surface of the first substrate 11 consisted of glass, and on the first substrate 11, the seal layer 2 is formed. At this moment, the seal layer 2 is formed so as to enclose a space in which a liquid crystal agent is enclosed in a later procedure, that is to say, a liquid crystal enclosing portion. This liquid crystal enclosing portion is enclosed with and formed by the seal layer 2, the first substrate 11 and the second substrate 12, which is superimposed over the first substrate 11 in a later procedure. Moreover, in the seal layer 2, opening portion 4, by which the liquid crystal enclosing portion is connected to the external is formed in order to inject a liquid crystal agent from the external into the liquid crystal enclosing portion.

On the other hand, as shown in FIG. 2B, a spacer 16 is scattered by a scattering nozzle 15 on the adhesive surface of the second substrate 12 consisted of glass. It should be noted that the adhesive surface of the first substrate 11 and the adhesive surface of the second substrate 12 refer to faces opposed to each other when each substrate is superimposed.

Next, as shown in FIG. 2C, a superimposed substrate 13 is formed by superimposing the first substrate 11 and the second substrate 12 so that the adhesive surface of the first substrate 11 and the adhesive surface of the second substrate 12 oppose to each other via the seal layer 2.

Subsequently, as shown in 2D, on the surface and back of the superimposed substrate 13, a flaw (scribe crack 18) is formed by a cutter 17 and the like. This scribe crack 18 is formed in order to cut the first substrate 11 and the second substrate 12 in desired dimensions. Dimensions are set, for example, so as to provide the extra length portion 3 (see FIG. 1) by setting the dimensions of the first substrate 11 larger than that of the second substrate 12 to have the terminal portion 31.

Subsequently, as shown in FIG. 2E, the superimposed substrate 13 is turned upside down, a break bar 19 and the like impact on a substrate (the first substrate 11) separate from the substrate (the second substrate 12) on which the predetermined scribe crack 18 is formed, thereby cracking (breaking) the substrate from the scribe crack 18 as the starting point.

The liquid crystal display substrate 1 as shown in FIG. 2F is tailored by repeating these breaks.

However, there are the following problems shown below in a conventional liquid crystal display substrate and its method of fabrication.

First, in a cutting process (hereinafter, referred to as mechanical cutting process) of the superimposed substrate 13 performed by the break bar 19, its cutting surface may be roughed, as a result, cutting chips of glass such as cullet and particle may be attached on the cutting surface. Therefore, in order to remove glass chips such as cullet and particle from the product, it is required to provide abrasive machining process and washing process of the substrate after the mechanical cutting process, thereby resulting in problems of complication of fabrication processes and an increase of fabrication cost.

Moreover, it is difficult to obtain an appropriate cutting surface by the influence of the seal layer 2 existing between two sheets of substrates in the case of cutting two sheets of substrates bonded together, differing from the case of cutting one sheet of substrate. FIG. 3 is a sectional view showing a method of cutting a substrate in a method of fabricating a conventional liquid crystal display substrate. As shown in FIG. 3, for example, as an instance of an appropriate cutting surface, in the case where the terminal surfaces of the first substrate 11 and the second substrate 12 and the terminal surface 2a of the seal layer 2 are formed to be flattened, the scribe crack 18 is provided at a position corresponding to an approximately vertical lower position of a terminal face 2a of the seal layer 2 in the first substrate 11. At this moment, when the first substrate 11 and the second substrate 12 are cut by the break bar 19, although cutting of the substrates is initiated from the scribe crack 18 as a starting point, the bias of stress in the vicinity of the terminal face 2a of the seal layer 2 occurs within the first substrate 11 and precision of cutting is lowered.

This is caused by the fact that symmetry of the stress as a center of the break bar 19 is out of balance since the seal layer 2 strongly restrains the first substrate 11. Therefore, it is necessary to add cutting precision and previously set the formation position of the scribe crack 18 and a striking position by the break bar 19 outward from the terminal face 2a of the seal layer 2. Therefore, there are problems that an area where the liquid crystal layer 20 in the liquid crystal display substrate 1 is formed becomes smaller and a display area in the liquid crystal display substrate 1 becomes smaller. It should be noted that said term "outward" refers to a direction of outside as a boundary line of a seal agent in the liquid crystal display substrate 1, accordingly, the term "inward" of the seal agent refers to within the liquid crystal injection area, that is to say, within the liquid crystal layer 20.

Moreover, in Japanese Patent Application Laid Open Publication No. 5-188387, a structure of a substrate forming a dummy seal layer made opposed to the opening portion of the seal area on the extra length portion in the vicinity of the external terminal of the substrate (electrode substrate) and its method of fabricating the substrate have been disclosed. This structure will be described below with reference to FIG. 4.

FIG. 4 is a sectional view showing a constitution of a substrate having a dummy seal layer disclosed in Japanese Patent Application Laid Open Publication No. 5-188387. As shown in FIG. 4, in the case where the dummy seal layer 21 is provided outward from the scribe crack 18, the stress applied to the first substrate 11 can be made symmetry to the break bar 19 in the mechanical cutting process. However, in this case, since it must sufficiently secure the extra length portion, there is a problem of reducing the display area in the liquid crystal display substrate.

In addition, even in the case where cutting of a substrate is performed by a laser (hereinafter, referred to as laser cutting) in order to prevent cutting surface from being roughed as seen in the mechanical cutting, although occurrence of cullet and particles can be suppressed, cutting face of the substrate is formed in a cracked shape just like peeled off by the seal layer being intervening between the substrates.

FIG. 5A is a sectional view showing a method of fabricating a liquid crystal display substrate by a conventional laser cutting and FIG. 5B is its perspective view. Concretely, as shown in FIG. 5A, on a surface of the superimposed substrate 13, which is made by the first substrate 11 and the second substrate 12 sandwiching the seal layer 2, the scribe crack 18 is formed, in the case where laser cutting is performed to the substrate on which the scribe crack 18 is formed by irradiation of a laser 26 from a laser head 25, since the seal layer 2 strongly restrains the first substrate 11 and the second substrate 12, symmetry of stress is out of balance, thermal stress by laser irradiation acts asymmetrically to the scribe crack 18, and cutting of the substrates 11 and 12, and the seal layer 2 linearly can not be carried out. As a result, as shown in FIG. 5B, the cross sections of the first substrate 11 and the second substrate 12 are formed in a bend shape in the position where the seal layer 2 is formed. Particularly, since the cross section of the second substrate 12 is formed in an expanded shape toward the extra length portion 3 or the terminal portion 31 on the first substrate 11, there is a problem that lowering the cutting precision is occurred.

Furthermore, in a conventional method of fabricating a liquid crystal display substrate, after a liquid crystal agent is injected into the liquid crystal display substrate 1, there is a problem that a process (panel washing process) in which the liquid crystal agent attached on the liquid crystal display substrate is washed by a panel washing device using a washing agent and pure water is multiplied. The panel washing process concretely refers to a process in which a plurality of liquid crystal display substrates are stored in a specialized cassette, immersed in a tank and washed. Because a washing agent employed in this washing process contains the component corroding metal, it may be possible to occur an incomplete conductivity of an electrode and the like formed on the terminal portion by residual of the washing agent on the liquid crystal display substrate. This is caused by the fact that the terminal face 2a of the seal layer 2 forms a concave portion to the terminal faces 11a and 12a of the first substrate 11 and the second substrate 12, and a liquid crystal agent, a washing agent or the like remains in this concave portion.

Therefore, there are problems that facilities using in the following processes of the liquid crystal display substrate are likely to be polluted by having such a structure, the extra cost is occurred and the yield is lowered as well as the washing process has to be provided over and over again in fabricating a liquid crystal display substrate.

SUMMARY OF THE INVENTION

An object of the present invention is to provide a method of fabricating a liquid crystal display substrate and a liquid crystal display substrate in which the extra length portion of a substrate can be made as small as possible as well as cutting precision of a substrate is enhanced, pollution to the facilities of the following processes due to the occurrence of particles and cullet can be prevented, furthermore, a substrate can be cut without any influence from the seal layer even in the cutting process of performing laser irradiation to the surface of the superimposed substrate.

A method of fabricating a liquid crystal display substrate according to the present invention, at least one or more scribe cracks are formed on each surface of two sheets of substrates, said two sheets of substrates are bonded together via a seal layer disposed so as to enclose the predetermined area where a liquid crystal layer is formed in such a manner that faces on which said scribe cracks are formed oppose each other and this bonded substrate is cut.

In the present invention, break are initiated from faces on which the two sheets of substrates oppose each other in cutting substrates, the bias of cutting stress occurred on the substrates due to the fixing by the seal layer can be prevented, thereby resulting in being capable of suppressing variation of shapes of a cutting face to the minimum and capable of cutting substrates with fine precision.

Moreover, said seal layer can be formed on said scribe crack.

Owing to this, since the seal layer is cut based on the formation of the scribe crack, the extra length portion of the substrate can be diminished as well as a liquid crystal display area is enlarged, comparing to the case where the outside of the seal layer is conventionally cut. Moreover, in cutting by laser, a cutting face of the seal layer and a cutting face of the substrate are formed into a continuous terminal face in an approximately one face, a phenomenon that cullet, particles and the like are mixed into the liquid crystal layer can be reduced when a liquid crystal is injected into the superimposed substrate. Furthermore, the panel washing process can be simplified.

In addition, said cutting of the substrate can be performed by giving an impact on a face opposite to the face on which the scribe crack is formed on said substrate. Otherwise, it can be performed by laser-irradiating on the face opposite to the face on which the scribe crack is formed on said substrate.

Owing to this, cutting faces become of mirror surfaces, a phenomenon that particles, cullet and the like are mixed into the liquid crystal layer can be reduced when a liquid crystal is injected into the superimposed substrate. Owing to this, that particles, cullet and the like can be prevented from damaging a liquid crystal display substrate itself due to impact and the like occurred in transporting a liquid crystal display substrate as well as a display ability of a liquid crystal is enhanced.

A liquid crystal display substrate, comprising: two sheets of substrates, each of said substrates having a terminal face; a liquid crystal layer disposed between the substrates; and a seal layer sandwiched between said two sheets of substrates and enclosing said liquid crystal layer, said seal layer having a terminal face forming a substantially continuous cutting surface with said terminal face of at least one of said substrates.

In the present invention, even in the case where cullet, particles and the like occur on the terminal face, that is to say, cutting face, residual of foreign bodies can be prevented in the following processes, for example, in the liquid crystal injection process and the washing process as well as removal of these is easily made. Moreover, since the seal layer is cut on the basis of the formation of the scribe crack, the extra length portion of a substrate can be diminished as well as a liquid crystal display area is enlarged.

Another liquid crystal display substrate, comprising: two sheets of substrates, each of said substrates having a terminal face; a liquid crystal layer disposed between the substrates; and a seal layer sandwiched between said two sheets of substrates and enclosing said liquid crystal layer, said seal layer having a terminal face formed on a substantially identical plane with said terminal face of at least one of said substrates.

In the present invention, even in the case where cullet, particles and the like occur on the terminal face, residual of foreign bodies can be prevented in the following processes, for example, the liquid crystal injection process and the washing process as well as removal of these is easily made. That terminal faces of at least two layers including said seal layer are formed in an approximately identical plane indicates that terminal faces of at least two layers including said seal layer are formed in an approximately one plane. Concretely, this means that terminal faces of at least two-layer-terminal faces including said seal layer constitute an approximately flat plane via the boundary.

Moreover, in at least one terminal face, a terminal face of said seal layer and terminal faces of said two sheets of substrates are continuously formed.

Owing to this, even in the case where cullet, particles and the like occur on a terminal face, residual of foreign bodies can be prevented in the following processes, for example, the liquid crystal injection process and the washing process as well as removal of these is easily made. It should be noted that the terminal face of said seal layer and terminal faces of the two sheets of substrates refer to at least any one of terminal faces other than the terminal face on which the extra length portion is provided.

Furthermore, in at least one terminal face, the terminal face of said seal layer and terminal faces of said two sheets of substrates can form a substantially identical plane.

Owing to this, even in the case where cullet, particles and the like occur on the terminal face, residual of foreign bodies which will be a cause of an incomplete product can be prevented in the following processes, for example, in the liquid crystal injection process and the washing process, as well as removal of these is easily made. It should be noted that the terminal face of said seal layer and terminal faces of the two sheets of substrates refer to at least any one of terminal faces other than the terminal face on which the extra length portion is provided.

Still other liquid crystal display substrate, comprising: two sheets of substrates, each of said substrates having a terminal face; a liquid crystal layer disposed between said substrates; and a seal layer sandwiched between said two sheets of substrates and enclosing said liquid crystal layer, said seal layer having a terminal face formed in a projecting shape from said terminal face of at least one of said substrates.

In the present invention, even in the case where cullet, particles and the like occur on the terminal face, residual of foreign bodies can be prevented in the following processes, for example, in the liquid crystal injection process and the washing process as well as removal of these is easily made.

Still yet other liquid crystal display substrate, comprising: two sheets of substrates, each of said substrates having a terminal face; a liquid crystal layer disposed between the substrates; and a seal layer sandwiched between said two sheets of substrates and enclosing said liquid crystal layer, said seal layer having a terminal face, and a distance between said terminal face of said seal layer and said terminal face of at least one of said substrates being substantially equal to or less than 0.5 mm.

In the present invention, in the concave portion formed by two sheets of the substrates and the seal layer, by making the distance between at least one terminal face of the substrates and the terminal face of the seal layer less than 0.5 mm, a liquid crystal agent, a washing agent or the like does not remain in said concave portion in the following processes, or removal of it is easily made. Therefore, pollution with the washing agent and the liquid crystal agent in the washing process and the liquid crystal enclosing process can be prevented. It should be noted that the term "substantially" is modified to an area except an opening portion at which the liquid crystal is injected into the liquid crystal enclosing portion out of the areas on which the seal layer is formed. Moreover, the distance between said terminal faces is a distance in a vertical direction to said terminal faces.

Moreover, terminal faces of said seal layer and at least one of substrates can be of mirror surfaces.

Owing to this, when a liquid crystal is injected into a superimposed substrate, a phenomenon that particles, cullet and the like are mixed into the liquid crystal layer can be reduced. Moreover, that particles, cullet and the like, which are mixed into the liquid crystal layer by impact and the like occurred in transporting the liquid crystal display substrate, can be prevented from damaging the liquid crystal display substrate itself. It should be noted that the term "mirror surface" refers to a terminal face having less than 0.1 $\mu$m of surface roughness and this mirror surface is formed by cutting with $CO_2$ laser and the like.

DESCRIPTION OF THE PREFERRED EMBODIMENT

An embodiment of the present invention will be described in detail below with reference to the appended drawings.

Figure 1A:
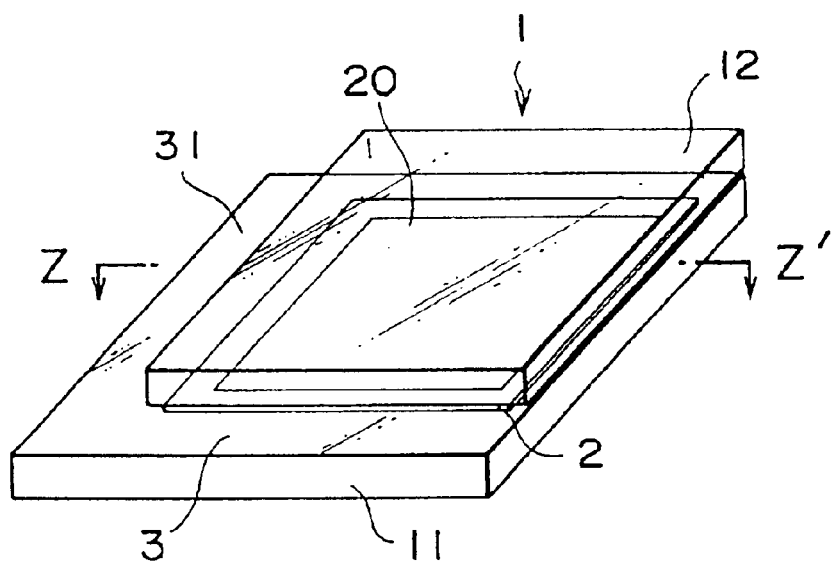
FIG. 1A is a perspective view showing a constitution of a conventional liquid crystal display substrate.
Figure 1B:
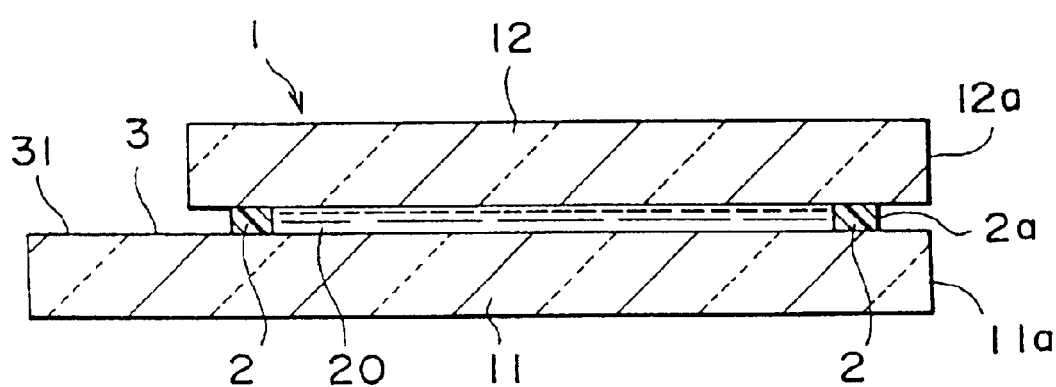
FIG. 1B is a sectional view taken on the line of Z–Z' of FIG. 1A.
Figure 2A:
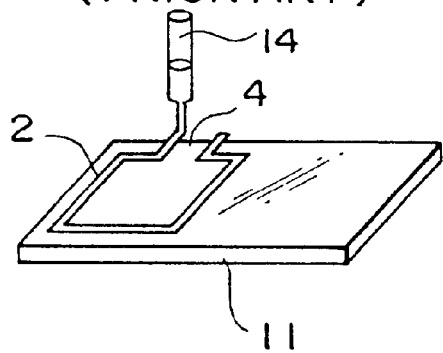
FIG. 2A is a perspective view showing a conventional method of fabricating a liquid crystal display substrate.
Figure 2B:
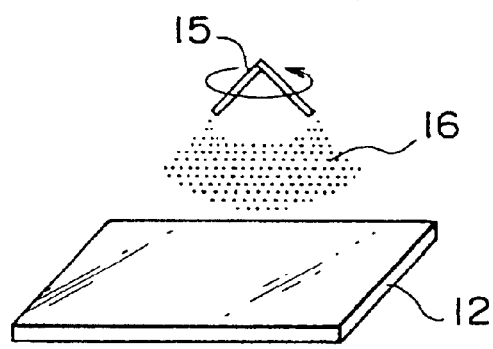
FIG. 2B is a perspective view showing a conventional method of fabricating a liquid crystal display substrate.
Figure 2C:
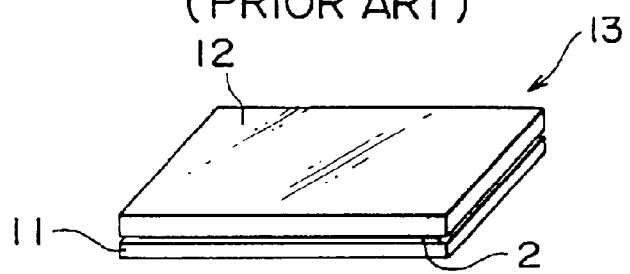
FIG. 2C is a perspective view showing a step subsequent to the step of FIGS. 2A and 2B.
Figure 2D:
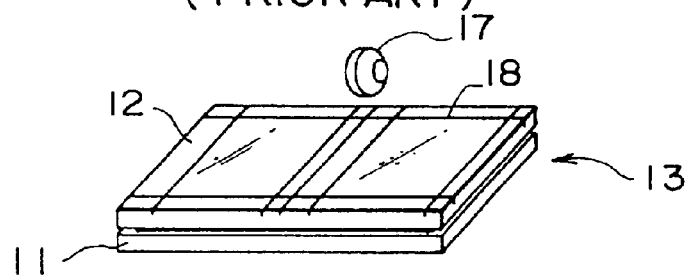
FIG. 2D is a perspective view showing a step subsequent to the step of FIG. 2C.
Figure 2E:
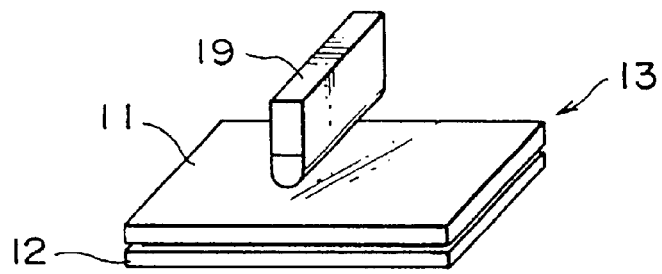
FIG. 2E is a perspective view showing a step subsequent to the step of FIG. 2D.
Figure 2F:
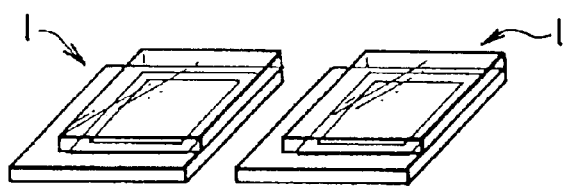
FIG. 2F is a perspective view showing a step subsequent to the step of FIG. 2E.
Figure 3:
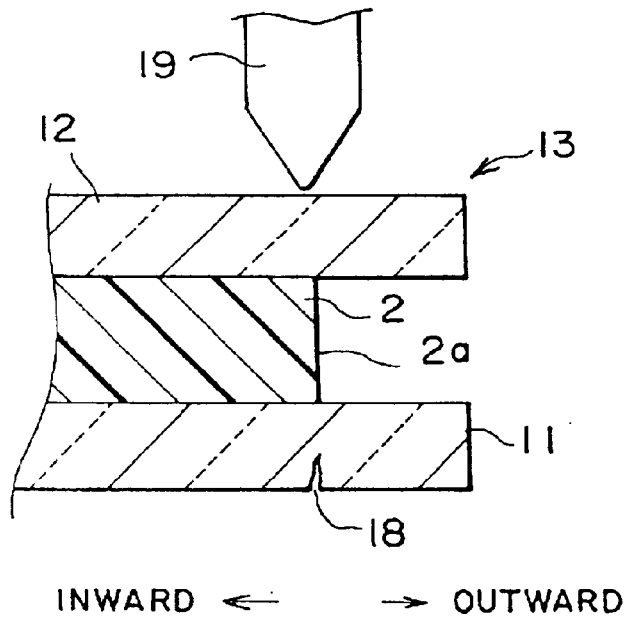
FIG. 3 is a sectional view showing a method of cutting a substrate in a conventional method of fabricating a liquid crystal display substrate.
Figure 4:
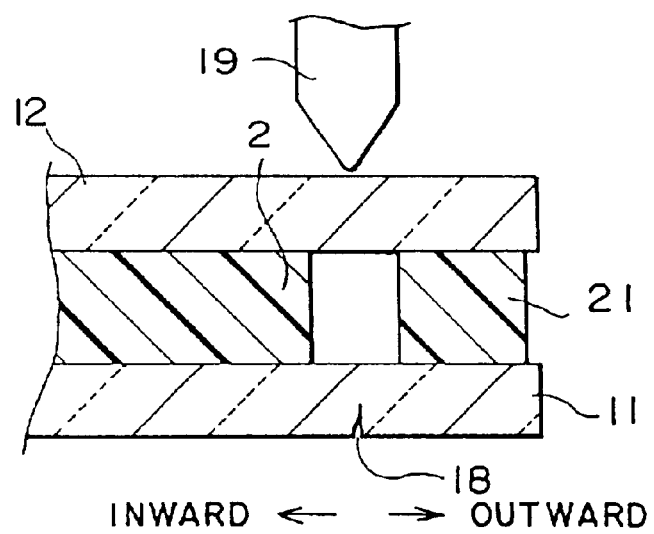
FIG. 4 is a sectional view showing a constitution of a substrate having a dummy seal layer disclosed in Japanese Patent Application Laid Open Publication No. 5-188387.
Figure 5A:
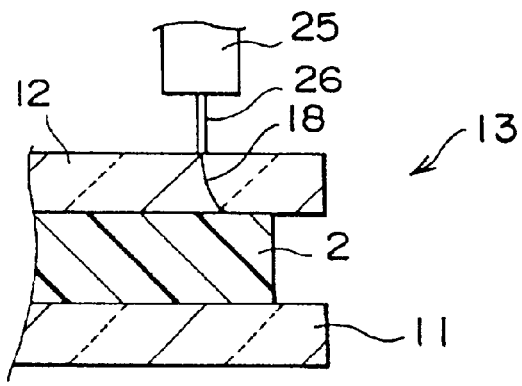
FIG. 5A is a sectional view showing a conventional method of fabricating a liquid crystal display substrate by laser cutting.
Figure 5B:
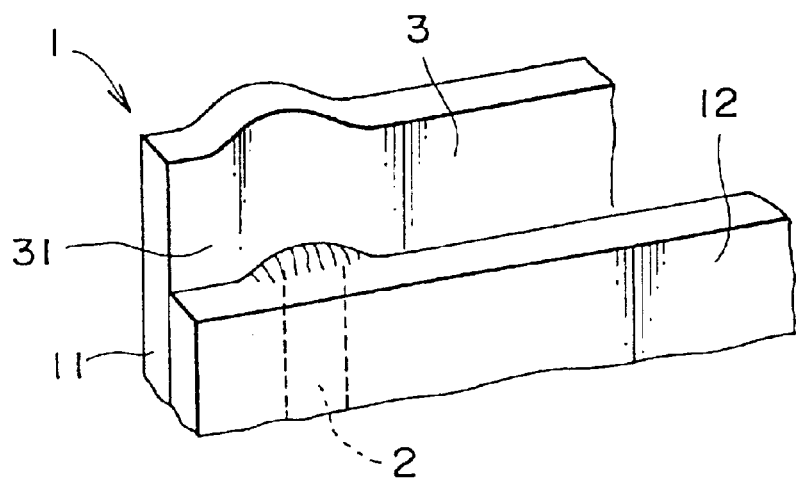
FIG. 5B is a perspective view showing the method of fabricating the liquid crystal display substrate shown in FIG. 5A.
Figure 6A:
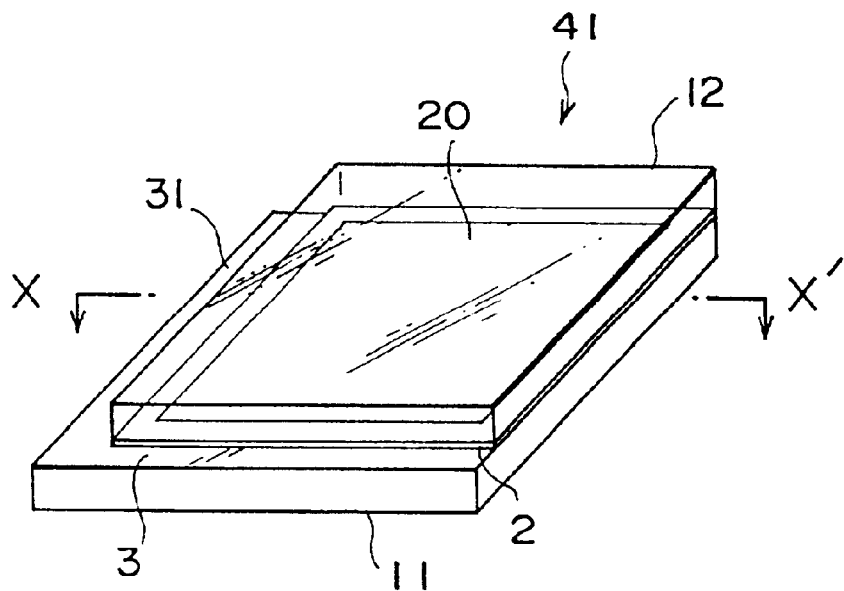
FIG. 6A is a perspective view showing a constitution of a liquid crystal display substrate according to an embodiment of the present invention.
Figure 6B:
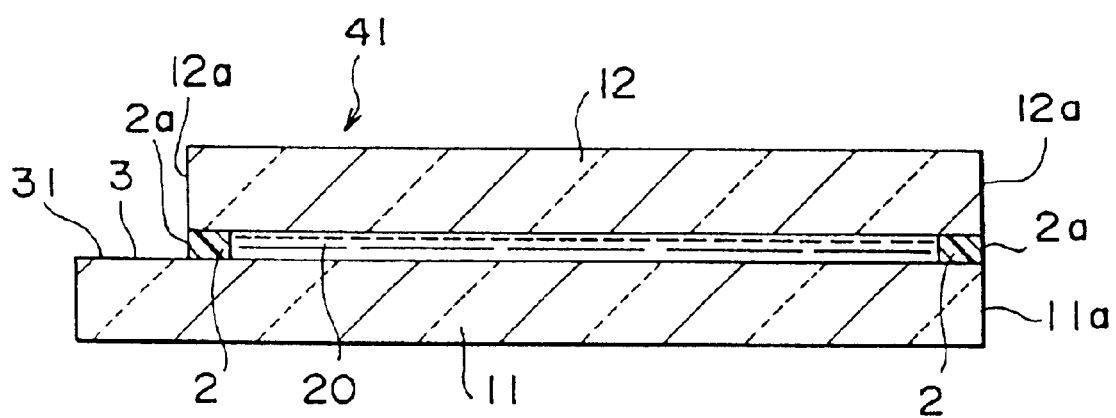
FIG. 6B is a sectional view taken on the line X–X' of FIG. 6A.

FIG. 6A is a perspective view showing a constitution of a liquid crystal display substrate according to the embodiment, FIG. 6B is a sectional view taken on the line X–X' of FIG. 6A. As shown in FIG. 6A, a liquid crystal display substrate 41 according to the embodiment is consisted of a first substrate 11 of transparent glass in a flat plate shape, a second substrate 12 disposed as opposed to the first substrate 11, a seal layer 2 disposed between the first substrate 11 and the second substrate 12 and sandwiched between these substrates.

The first substrate 11 is set larger than the second substrate 12, on the adhesive surface of the first substrate 11, a terminal portion 31 is formed in which a circuit (not shown) consisted of TFT (thin-film-transistor) and the like is disposed in an area (extra length portion 3) not opposed to the second substrate 12. Moreover, the seal layer 2 is disposed along an edge of an adhesive surface of the second substrate 12. Specifically, by means of the seal layer 2 being formed, the first substrate 11, the second substrate 12 and the seal layer 2 form a space inside thereof, and a liquid crystal agent 20 is enclosed in this space. The liquid crystal agent 20 and the seal layer 2 can be seen through the second substrate 12 in FIG. 6A.

As shown in FIG. 6B, on the side where the terminal portion 31 is formed, the terminal face 12a of the second substrate 12 and the terminal face 2a of the seal layer 2 form a substantially continuously identical plane, and each face is completed to be of a mirror surface. Moreover, on the opposite side of the side where the terminal portion 31 is formed, the terminal face 11a of the first substrate 11, the terminal face 2a of the seal layer 2 and the terminal face 12a of the second substrate 12 form a substantially continuously identical plane, and surface roughness of each face is that of mirror surface. It should be noted that mirror surface refers to, for example, a surface having less than 0.1 $\mu$m of surface roughness, and this mirror surface is formed by cutting with $CO_2$ laser and the like.

Next, a method of fabricating a liquid crystal display substrate according to the embodiment will be described with reference to the appended drawings. FIGS. 7A, 7B, 8A, 8B and FIGS. 9A to 9D are drawings showing a method of fabricating a liquid crystal display substrate according to the embodiment in an order of steps of a procedure. In the embodiment, a method that two sheets of liquid crystal display substrates are made of a superimposed substrate, which is consisted of two sheets of glass substrates sandwiching a seal agent, will be described below.

Figure 7A:
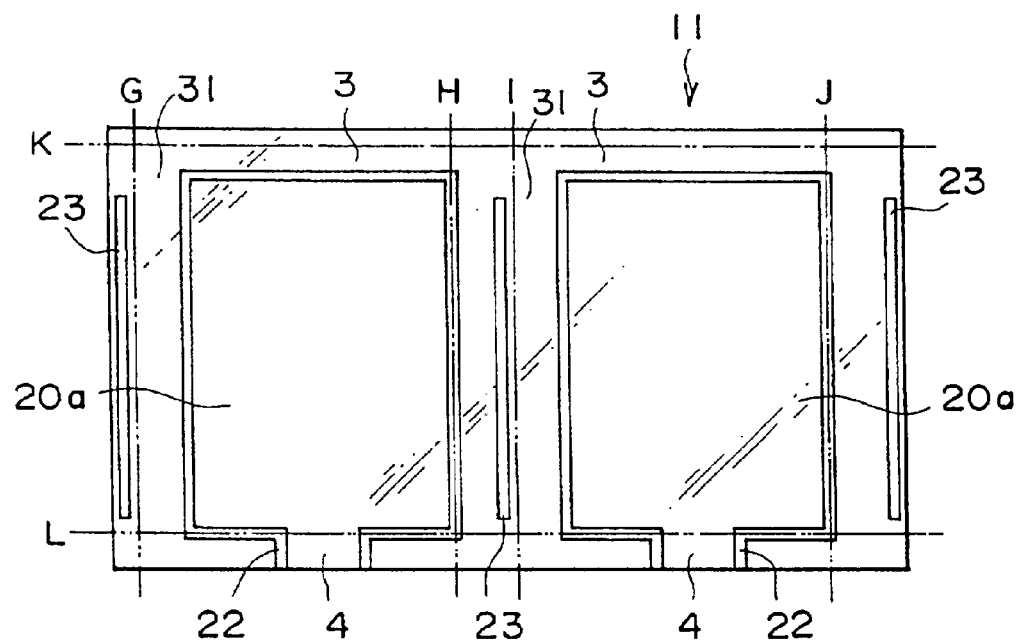
FIG. 7A is a plan view showing a method of fabricating the liquid crystal display substrate according to the embodiment.
Figure 7B:
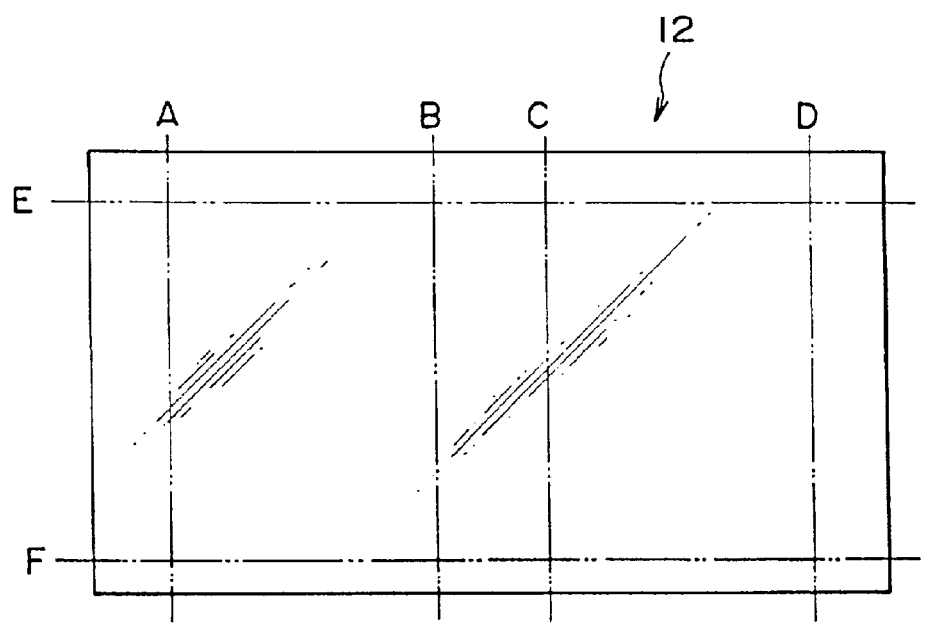
FIG. 7B is a plan view showing the method of fabricating the liquid crystal display substrate according to the embodiment.

First, as shown in FIGS. 7A and 7B, a scribe cracks A to L are formed on each adhesive surface of the first substrate 11 and the second substrate 12 by laser irradiation. The term "adhesive surface" refers to each face opposed to the other when each substrate of the first substrate 11 and the second substrate 12 is superimposed on the other in the following process.

By employing FIG. 7A, scribe cracks will be described below which is formed on the adhesive surface of the first substrate 11. As shown in FIG. 7A, on the adhesive surface of the first substrate 11, four lines of scribe cracks G, H, I and J extending in parallel each other in a longitudinal direction, and two lines of scribe cracks K and L extending in parallel each other in a transverse direction are formed. At this moment, the scribe cracks G, H, I and J, and the scribe cracks K and L are formed so as to be perpendicularly crossed.

Among them, at least one portion of the scribe cracks H and J and the scribe crack L are provided on an application-scheduled area of a seal agent previously positioned. It should be noted that the term "seal agent" refers to a heat-setting resin for bonding and fixing both when the first substrate 11 and the second substrate 12 are superimposed.

Moreover, the scribe cracks G and I are formed in the vicinity of an scheduled area to be applied with a dummy seal agent in the following steps and are formed in parallel to applied area of said dummy seal agent on the side of a formation area of the terminal portion 31 on the first substrate 11. It should be noted that the dummy seal agent is formed in parallel each other, one being in the vicinity of a terminal face on the adhesive surface of the first substrate 11 and the other being at the center area which divides the first substrate 11 into two in a transverse direction.

In a method of fabricating a liquid crystal display substrate according to the embodiment, the scribe cracks A to L are formed by laser, however, a method of forming this scribe cracks A to L may be a conventionally-employed method of forming them by a cutter.

After thus forming the scribe cracks G to L, the seal agent 22 and the dummy seal agent 23 are applied on the first substrate 11. At this moment, an area on which the seal agent 22 is applied is an area enclosing the liquid crystal display area 20a, for example, as shown in FIG. 7A, is applied in a shape of rectangular end-edge. Moreover, the opening portion 4 is formed in order to inject a liquid crystal into the liquid crystal display area 20a. Specifically, this opening portion 4 is formed so as to communicate between the liquid crystal display area 20a and the external of the liquid crystal display substrate 11.

On the other hand, on the adhesive surface of the second substrate 12, four lines of the scribe cracks A, B, C and D extending in a longitudinal direction are formed in parallel to each other, and two lines of the scribe cracks E and F extending in a transverse direction are formed in parallel to each other. The scribe cracks formed on the surface of the second substrate 12 are formed at the position where the seal layer 2 provided on the first substrate 11 and the scribe cracks formed on the second substrate 12 are contacted with each other when the second substrate 12 is superimposed on the first substrate 11. Concretely, the scribe cracks A and B, and the scribe cracks E and F are formed in a shape of rectangular end-edge for forming the liquid crystal display area 20a, and made it a second substrate forming a first liquid crystal display device. Similarly, the scribe cracks C and D, and the scribe cracks E and F are formed in a shape of rectangular end-edge for forming the liquid crystal display area 20a, and made it a second substrate forming a second liquid crystal display device.

Subsequently, the first substrate 11 an the second substrate 12 are superimposed via the seal agent 22, the dummy seal agent 23 and the spacer (not shown), irradiating ultraviolet light while pressurizing and the seal agent 22 and the dummy seal agent 23 are hardened. As a result, the dummy seal layer 21 is formed by hardening the dummy seal agent 23 as well as the seal layer 2 is formed by hardening the seal agent 22, and the superimposed substrate 13 constitutes three layers structure with the first substrate 11 and the second substrate 12, and the seal layer 2 and the dummy seal layer 21.

The relationship of positions between the scribe cracks A to L, the seal layer 2 and the dummy seal layer 21 of the superimposed substrate 13 will be described below. It should be noted that the term "surface of the superimposed substrate 13" refers to a face of the opposite side of the adhesive surface of the second substrate 12, and similarly, the term "the back of the surface of the superimposed substrate 13" refers to a face of the opposite side of the adhesive surface of the first substrate 11.

Figure 8A:
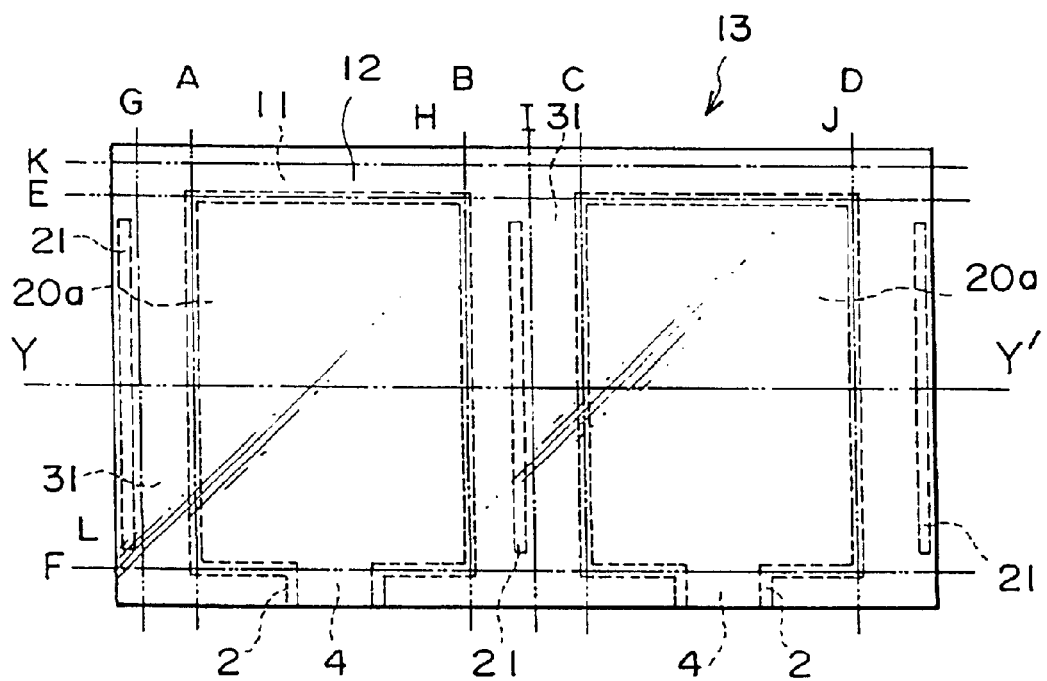
FIG. 8A is a plane view showing the process subsequent the processes of FIGS. 7A and 7B in the method of fabricating the liquid crystal display substrate according to the present embodiment.
Figure 8B:
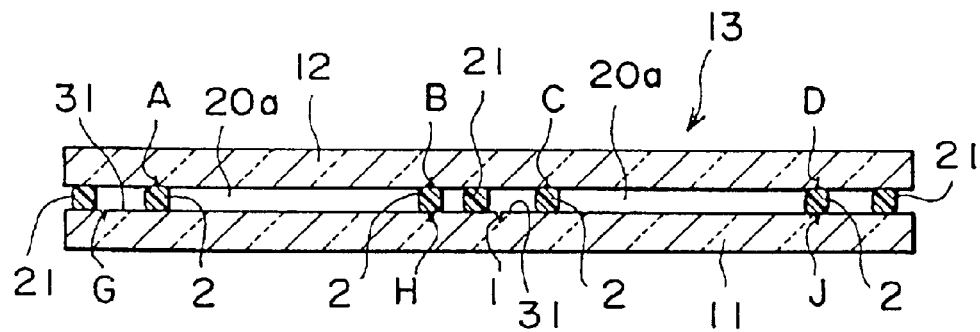
FIG. 8B is a sectional view taken on the line Y–Y' of FIG. 8A.

FIG. 8A is a plane view of a superimposed substrate 13, which the first substrate 11 and the second substrate 12 are superimposed via the seal layer 2, seen from the surface side of the second substrate 12, and FIG. 8B is a sectional view taken on the line Y–Y' of FIG. 8A. As shown in FIG. 8A, an area enclosed by the scribe cracks A and B, and the scribe cracks E and F forms one of the second substrate on the liquid crystal display substrate, and an area enclosed by the scribe cracks C and D, and the scribe cracks E and F forms the other of the second substrate on the liquid crystal display substrate. On the other hand, an area enclosed by the scribe cracks G and H, and the scribe cracks K and L forms one of the first substrate on the liquid crystal display substrate, and an area enclosed by the scribe cracks I and J, and the scribe cracks K and L forms the other of the first substrate on the liquid crystal display substrate.

Moreover, an area formed by the scribe cracks G and A, and both of the terminal faces of the first substrate 11 forms the terminal portion 31, and similarly an area formed by the scribe cracks I and C, and both of the terminal faces of the first substrate 11 forms the terminal portion 31. The scribe cracks B and H, the scribe cracks D and J, and the scribe cracks F and L are the scribe cracks which are located at the identical position on the first substrate 11 and the second substrate 12.

Moreover, as shown in FIG. 8A and FIG. 8B, one of the seal layer 2 is formed on an area constituting rectangular end-edge formed by the scribe cracks A, B, E and F. Moreover, the other of the seal layer 2 is formed on an area constituting rectangular end-edge formed by the scribe cracks C, D, E and F.

In addition, between the scribe crack L and the terminal face of the first substrate 11, the opening portion 4 for communicating between the liquid crystal display area 20a formed in the rectangular shape and the external is formed by the seal layer 2.

Furthermore, the dummy seal layer 21 is disposed between the scribe crack G and the terminal face of the first substrate 11, between the scribe crack H and the scribe crack I, and between the scribe crack J and the terminal face of the first substrate 11. It should be noted that the term "the terminal face of the first substrate" described above refers to the terminal face of the first substrate 11 which is the closest to each scribe crack. For example, "the terminal face of the first substrate 11" in the description of the dummy seal layer 21 disposed between the terminal face of the first substrate 11 and the scribe crack G refers to the terminal face of the first substrate 11 which is the closest to the scribe crack G, and does not refer to the terminal face in a direction in which the scribe crack K is formed as a reference of the scribe crack L. The dummy seal layer 21 is provided in order to prevent the bias of the stress when cutting the substrate(s) at the scribe crack(s).

Figure 9A:
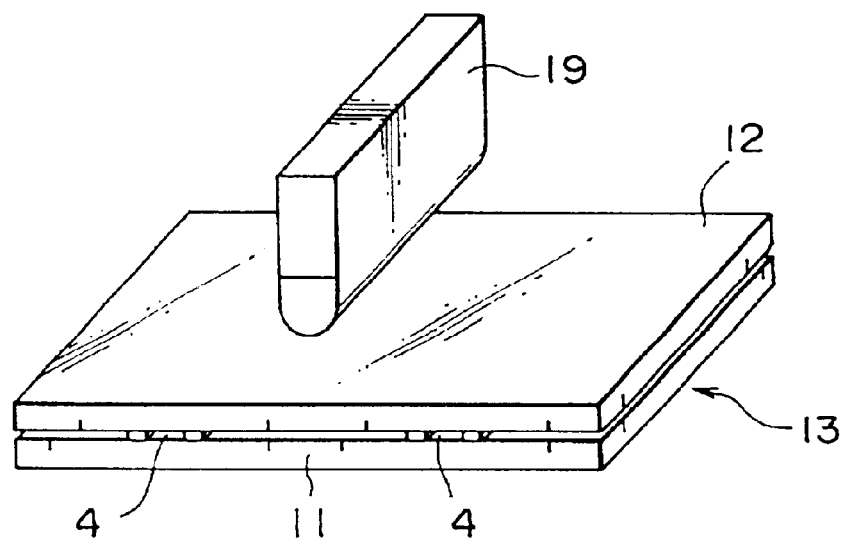
FIG. 9A is a perspective view showing a step subsequent to the step of FIGS. 8A and 8B in the method of fabricating the liquid crystal display substrate according to the embodiment.
Figure 9B:
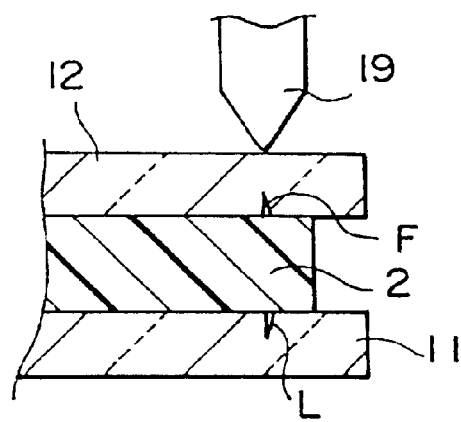
FIG. 9B is a sectional view showing the method of fabricating the liquid crystal display substrate shown in FIG. 9A.

Subsequently, the superimposed substrate 13 thus formed is cut on the basis of the formation position of the scribe cracks A to L. FIG. 9A is a perspective view showing a step subsequent to the step of FIGS. 8A and 8B in a method of fabricating a liquid crystal display substrate according to the embodiment, and FIG. 9B is a sectional view showing a method of fabricating a liquid crystal display substrate shown in FIG. 9A. This cutting performs, for example, as shown in FIG. 9A, a mechanical cutting which cuts the substrate of lower side (the first substrate 11) by giving an impact on the substrate of the upper side (the second substrate 12) with the break bar 19 after the substrate for cutting (the first substrate 11) is made lower side.

Or, as shown in FIG. 9B, in the case where the second substrate 12 is cut along the scribe crack F formed on the second substrate 12, an impact is given to the face of the opposite side of the adhesive surface on the second substrate 12 with the break bar 19. Owing to this, since the scribe crack F is formed on the adhesive surface of the second substrate 12 also via the seal layer 2, a crack is generated from the scribe crack F by an impact of the break bar 19, this crack extends toward the direction away from the seal layer 2, therefore, an appropriate cutting surface can be obtained without receiving an influence of the bias of the stress due to the seal layer 2. Specifically, by previously forming a scribe crack on the adhesive surface of the substrate to be cut, the point at which the cutting is initiated is specified, and an appropriate cutting surface can be obtained. It should be noted that the term "an appropriate cutting surface" described herein refers to a cutting surface for which the removal of the liquid crystal and the washing agent in the liquid crystal injection process and the washing process, which are the following processes, and refers to a cutting surface having less irregularity of shapes of the cutting surface of the product.

Figure 10:
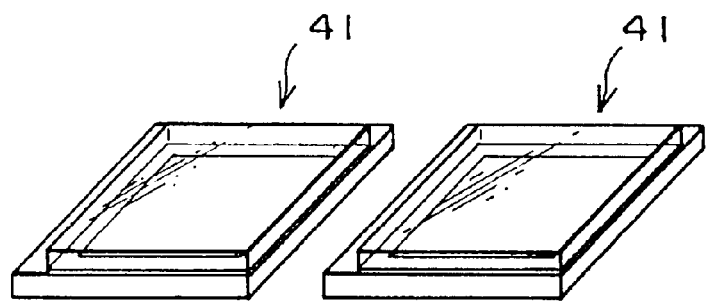
FIG. 10 is a perspective view showing a step subsequent to the step of FIGS. 9A and 9B in the method of fabricating the liquid crystal display substrate according to the embodiment.

FIG. 10 is a perspective view showing a step subsequent to the step of FIGS. 9A and 9B in a method of fabricating a liquid crystal display substrate according to the embodiment. Subsequently, into the liquid crystal display area of the superimposed substrate which has been individually cut, a liquid crystal agent is injected, the opening portion 4 (see FIG. 8A) is enclosed, and two pieces of liquid crystal display substrates 41 are formed as shown in FIG. 10.

As described above, according to a method of fabricating a liquid crystal display substrate and a liquid crystal display substrate according to the embodiment, when a liquid crystal is injected into the superimposed substrate, such a phenomenon that cullet, particles and the like are mixed into the liquid crystal layer can be reduced. Moreover, a liquid crystal pollution, which lowers the precision of fabrication of a liquid crystal display substrate fabricated in the following processes, can be prevented, and the yield can be enhanced. In addition, the extra length portion of a substrate can be diminished as well as a liquid crystal display area can be expanded. Specifically, in the case where the embodiment is employed as a display of a notebook-sized personal computer, an area of frame can be diminished, and the miniaturization of a notebook-sized personal computer and a large image plane of a display can be realized.

Figure 11:
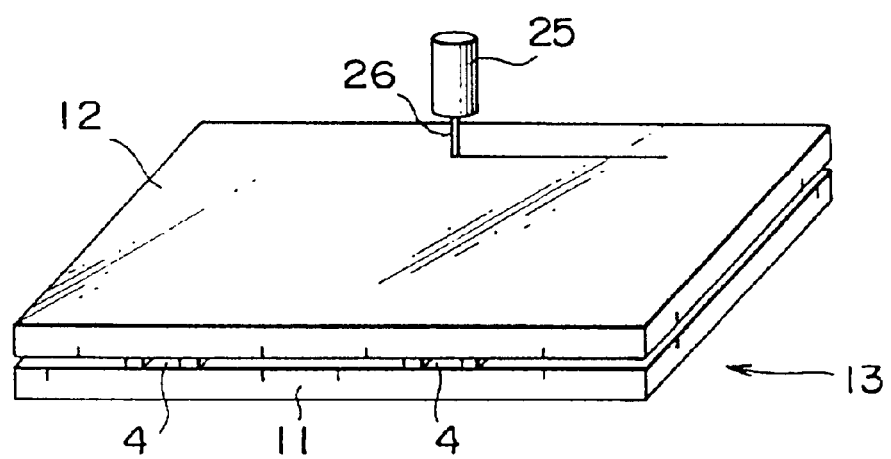
FIG. 11 is a perspective view showing a method of fabricating a liquid crystal display substrate according to a variation of the embodiment.

FIG. 11 is a perspective view showing a method of fabricating a liquid crystal display substrate according to a variation of the embodiment. In a method of fabricating a liquid crystal display substrate as shown in FIGS. 9A and 9B, an instance that the superimposed substrate 13 is mechanically cut by the break bar 19 is indicated, however, in the variation of the embodiment, as shown in FIG. 11, a laser cutting is performed by irradiating the laser 26 through the laser head 25. Owing to this, since a cutting surface whose surface roughness is small, and which is so-called mirror finished is formed as well as the point of initiating the cutting of a substrate is specified similar to a mechanical cutting, a highly appropriate cutting surface can be obtained.

Figure 12A:
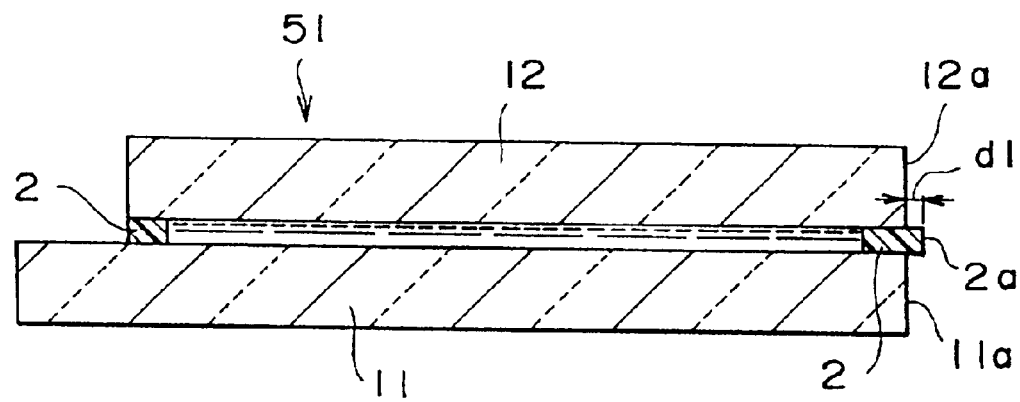
FIG. 12A is a sectional view showing a constitution of a liquid crystal display substrate according to an another variation of the embodiment.

FIG. 12A is a sectional view showing a constitution of a liquid crystal display substrate 51 according to another variation of the embodiment. As shown in FIG. 12A, in the variation of the embodiment, supposing that the seal layer 2 is configured to project with respect to the first substrate 11 and the second substrate 12. However, it is desirable to set the distance d1 between any one of the terminal face 11a of the first substrate 11 and the terminal face 12a of the second substrate 12, and the terminal face 2a of the seal layer 2 to be within about 0.5 mm. The liquid crystal display substrate 51 like this can be fabricated according to a method of a liquid crystal display substrate of the present invention.

Owing to this, at least removal of a liquid crystal agent and a washing agent during the liquid crystal agent injection process and the washing process can be carried out as easily as possible. Moreover, by thus providing the tolerance for the position of the terminal face 2a of the seal layer 2 relative to the terminal face of the first substrate 11 and the second substrate 12, the fabrication of a liquid crystal display substrate is easily performed and the yield is enhanced.

Figure 12B:
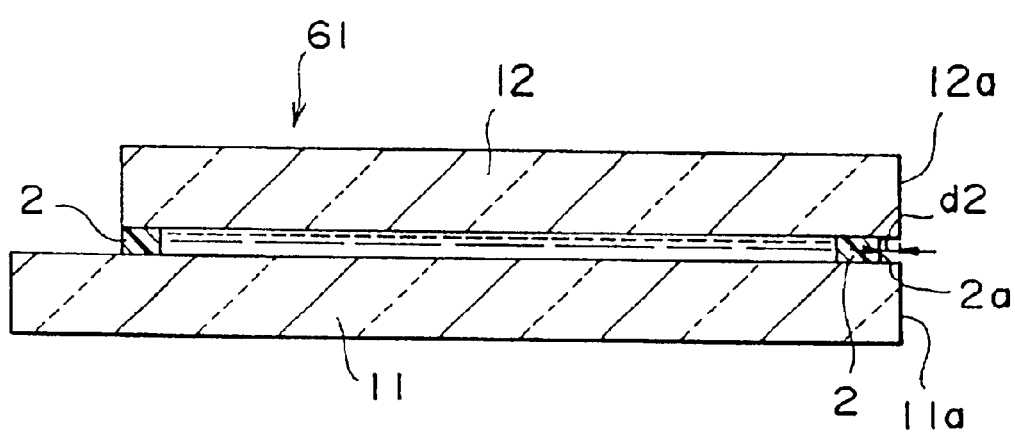
FIG. 12B is a sectional view showing a constitution of a liquid crystal display substrate according to a still another variation of the embodiment.

Moreover, FIG. 12B is a sectional view showing a constitution of a liquid crystal display substrate 61 according to still another variation of the embodiment. As shown in FIG. 12B, in the variation, each component is disposed so that the terminal face 2a of the seal layer 2 forms a concave portion relative to the terminal face 11a of the first substrate 11 and the terminal face 12a of the second substrate 12. However, it is desirable to set the distance d2 between at least any one of the terminal face 11a of the first substrate 11 and the terminal face 12a of the second substrate 12, and the terminal face 2a of the seal layer 2 to be approximately within 0.5 mm. The liquid crystal display substrate 61 is fabricated according to a method of fabricating the liquid crystal display substrate according to the present invention.

As described above, by providing the tolerance for the position of the terminal face 2a of the seal layer 2 relative to the terminal faces 11a and 12a of the first substrate 11 and the second substrate 12, the fabrication of a liquid crystal display substrate becomes easy, and the yield is enhanced.

What is claimed is:

1. A method of fabricating a liquid crystal display substrate, said liquid crystal display comprising a first sheet of substrate and a second sheet of substrate, each of said sheets having a first face and a second face, the second face of said first sheet opposing the first face of said second sheet, said method comprising the steps of:

forming at least two scribe cracks only on the second face of said first sheet and only on the first face of said second sheet, said at least two scribe cracks intersecting each other on the second face of said first sheet and intersecting each other on the first face of said second sheet;

adhering said two sheets of substrates to each other so that said faces on which said scribe cracks are formed oppose each other via a seal layer disposed so as to enclose an area, on which a liquid crystal layer is scheduled to be formed, and via a dummy seal layer disposed to prevent bias of stress when cutting the substrate; and cutting the adhered substrate.

2. The method of fabricating the liquid crystal display substrate according to claim 1, wherein said seal layer is formed on at least one of said at least two scribe cracks.

3. The method of fabricating the liquid crystal display substrate according to claim 1, wherein cutting of said adhered substrate is performed by giving an impact on a face opposite to the face on which said at least two scribe cracks are formed in said adhered substrate.

4. The method of fabricating the liquid crystal display substrate according to claim 1, wherein cutting of said adhered substrate is performed by irradiating laser on a face opposite to the face on which said at least two scribe cracks are formed in said adhered substrate.

* * * * *